United States Patent
Dunn et al.

(10) Patent No.: US 9,026,686 B2
(45) Date of Patent: May 5, 2015

(54) SYSTEM AND METHOD FOR REMOTELY IDENTIFYING DISPLAY COMPONENTS

(75) Inventors: William Dunn, Alpharetta, GA (US); Rick De Laet, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 223 days.

(21) Appl. No.: 13/045,599

(22) Filed: Mar. 11, 2011

(65) Prior Publication Data

US 2012/0057082 A1 Mar. 8, 2012

Related U.S. Application Data

(63) Continuation-in-part of application No. 12/989,787, filed on Nov. 23, 2010, and a continuation-in-part of application No. 12/763,797, filed on Apr. 20, 2010, now Pat. No. 8,441,574, and a continuation-in-part of application No. 12/706,594, filed on Feb. 16, 2010, and a continuation-in-part of application No. 12/706,602, filed on Feb. 16, 2010.

(60) Provisional application No. 61/312,892, filed on Mar. 11, 2010, provisional application No. 61/308,139, filed on Feb. 25, 2010, provisional application No. 61/152,876, filed on Feb. 16, 2009.

(51) Int. Cl.
| | | |
|---|---|---|
| G06F 3/00 | (2006.01) | |
| H04N 17/04 | (2006.01) | |
| G06F 3/0489 | (2013.01) | |
| H04N 21/00 | (2011.01) | |
| G06F 3/14 | (2006.01) | |

(52) U.S. Cl.
CPC ............ *H04N 17/04* (2013.01); *G06F 3/04897* (2013.01); *H04N 21/00* (2013.01); *G06F 3/1454* (2013.01); *G09G 2320/08* (2013.01)

(58) Field of Classification Search
None
See application file for complete search history.

(56) References Cited

U.S. PATENT DOCUMENTS

| | | | |
|---|---|---|---|
| 6,215,411 B1 | 4/2001 | Gothard | |
| 6,384,736 B1 | 5/2002 | Gothard | |
| 7,369,058 B2 | 5/2008 | Gothard | |
| 2004/0253947 A1* | 12/2004 | Phillips et al. | 455/422.1 |
| 2005/0070335 A1* | 3/2005 | Jitsuishi et al. | 455/566 |
| 2005/0132036 A1* | 6/2005 | Jang et al. | 709/223 |
| 2005/0267943 A1* | 12/2005 | Castaldi et al. | 709/206 |
| 2007/0273519 A1* | 11/2007 | Ichikawa et al. | 340/572.1 |
| 2008/0024268 A1* | 1/2008 | Wong et al. | 340/5.8 |
| 2008/0096559 A1* | 4/2008 | Phillips et al. | 455/435.2 |
| 2008/0112601 A1 | 5/2008 | Warp | |
| 2010/0253778 A1* | 10/2010 | Lee et al. | 348/143 |

FOREIGN PATENT DOCUMENTS

| | | |
|---|---|---|
| JP | 2002064842 | 2/2002 |
| JP | 2002209230 | 7/2002 |
| JP | 2005236469 | 9/2005 |

* cited by examiner

*Primary Examiner* — Elias Mamo
(74) *Attorney, Agent, or Firm* — Standley Law Group LLP

(57) ABSTRACT

A system and method for remotely-identifying the components and/or software revisions within an electronic display. An electronic storage device may be placed within an electronic display assembly and placed in electrical communication with a network connection. The electronic storage device may contain identification numbers for one or more components or software revisions within the display. A computing device may be in electrical communication with the network connection so that the identification numbers on the electronic storage device may be accessed remotely. If a particular component or software revision is desired, the computing device may be used to search the contents of each electronic storage device at each display to determine which displays contain the desired component or software revision.

10 Claims, 14 Drawing Sheets

FIG-4

Tabs: Home | Network Settings | System Settings | Display Status | Unit Upgrades Side menu:
- Set Time
- Set Password
- Save Configuration
- Shell Command
- Standby Mode
- Brightness Control
- SNMP Setting
- Reboot Display Name: Display1

The current data / time is: 12/31/1969 19:04:49

To change the time, enter the values in this format: mm/dd/yyyy hh:mm:ss

[12] / [31] / [1969]
[19] : [04] : [49]

[Submit]

FIG-5

Tabs: Home | Network Settings | System Settings | Display Status | Unit Upgrades Side menu:
- Set Time
- Set Password
- Save Configuration
- Shell Command
- Standby Mode
- Brightness Control
- SNMP Setting
- Reboot Display Name: Display 1

Current Web Password [      ]
New Web Password    [      ]
Re-type Web Password [      ]

[Submit]

| Home | Network Settings | System Settings | Display Status | Unit Upgrades |

Set Time
Set Password
Save Configuration
Shell Command
Standby Mode
Brightness Control
SNMP Setting
Reboot Display Name: Display1

Dynamic Brightness Control — Disabled
Ambient Sensor Location — Front & Back
High Ambient Reading — 1500
Fixed Brightness Value — 400
Desired High Nits — 600
Desired Low Nits — 360

Submit

FIG-8

| Home | Network Settings | System Settings | Display Status | Unit Upgrades |

Set Time
Set Password
Save Configuration
Shell Command
Standby Mode
Brightness Control
SNMP Setting
Reboot Display Name: Display 1

SNMP Community String — mn

Submit

FIG-9

| Home | Network Settings | System Settings | Display Status | Unit Upgrades |

Basic Status

Downtime Incidents

Upload Status

Name: Display1

| | |
|---|---|
| Run Time Since Last Power Up | 0 Days, 0 hrs, 8 mins, 54 sec |
| Num Active Downtime Incidents | 0 |
| Display Serial Number | ACM0024MU |
| Board Revision | B0 |
| Redboot Version | XYZ release, version 2.04.3 - built 16:00:21, Jul 16 2008 |
| Kernel Version | #10 Sun Mar 8 10:43:43 EDT 2009 |
| Root Filesystem Version | Revision 2.1.9 - Fri Aug 21 10:37:58 EDT 2009 |
| XYZ Filesystem Version | Revision 4.2.2 - Wed Jan 6 13:11:59 EST 2010 |
| Total Elapsed Run Time | 0 days, 7 hours, 38 mins, 15 secs |
| Total Backlight On Time | 0 days, 4 hours, 52 minutes |
| Total Valid DVI Input Time | 0 days, 0 hours, 26 minutes |
| DVI Input Status | Valid Resolution |
| DVI Input Resolution | 1920x1080 |
| AC Inlet Current | 4.66 AMPS |
| Power Supply 1 Status | OK |
| Power Supply 1 Current | 5.6 AMPS |
| Power Supply 1 Temperature | 41.8 |
| Power Supply 2 Status | OK |
| Power Supply 2 Current | 5.6 AMPS |
| Power Supply 2 Temperature | 46.7 |
| Power Supply 3 Status | OK |
| Power Supply 3 Current | 6.6 AMPS |
| Power Supply 3 Temperature | 46.7 |
| Air Outlet Temperature | 28.1 |
| Backlight Case Temperature | 29.0 |
| Front Ambient Light Reading | 15 |
| Rear Ambient Light Reading | 1414 |
| Display Brightness | 397 nits |
| Desired Brightness | 400 nits |
| Dynamic Backlight Control | Disabled |
| Backlight Light Reading | 41208 |
| DAC Setting | 8653 |
| Fan PWM1 Setting | 22% |
| Fan PWM2 Setting | 18% |
| Fan1 Tach Reading | 3900 |
| Fan2 Tach Reading | 4080 |
| Fan3 Tach Reading | 4740 |
| Fan4 Tach Reading | 4980 |
| Fan5 Tach Reading | 4860 |
| Fan6 Tach Reading | 4860 |
| Fan7 Tach Reading | 3960 |
| Fan8 Tach Reading | 4020 |
| Number of Active Errors | 0 |
| Number of Sensor Reads | 141 |
| Number of Verify Errors | 0 |
| Average Sensor Deviation | 0.20% |
| High Ambient Contrast Ratio | 62.89 |

FIG-11

| | Home | Network Settings | System Settings | Display Status | Unit Upgrades |
|---|---|---|---|---|---|

| Basic Status |
|---|
| Downtime Incidents |
| Upload Status |

Name: Display1

| Downtime Incidents Since Reset | 1 |
|---|---|
| | Reset Downtime Incidents |
| Up Time | 0 Days, 0 hrs, 10 mins, 11 sec |
| Current Time | Wed Dec 31 19:10:31 1969 |

1.
| Date | Wed Dec 31 19:00:34 1969 |
|---|---|
| Cause | No Valid DVI Input |
| Duration | 0 Days, 0 hrs, 5 mins, 25 sec |

FIG-12

| Home | Network Settings | System Settings | Display Status | DTU Upgrades |

Edit Network Settings

Transmitter: Xmitter

Receiver: 192.168.2.3 Pump1

Operation successful

| | |
|---|---|
| Access Point | 00:0E:8E:0F:D5:C0 |
| Host Name | [ Pump1 ] |
| IP Address | 192.168.3.3 |
| SSID | XYZwireless2 |
| WPA2 Passphrase | ************ |
| Wireless Channel | 52 |
| Wireless Transmitter Rate | 12 Mb/sec |
| Acceptable Frame Rate | 20 fps |
| Signal Quality | 46 |
| | [ Submit ] |

Return to transmitter pages

FIG-14

| Home | Network Settings | System Settings | Display Status | Receiver List | DTU Upgrades |

Basic Status
Downtime Incidents
Upload Status

Transmitter: Xmitter

Operation successful

| Downtime Incidents Since Reset | 6 |
| | [ Reset Downtime Incidents ] |
| Uptime | 3 Days, 1 h, 47m, 48s |
| Current Time | Fri Dec 19 15:25:31 2008 |

1
| Date | Fri Dec 19 15:25:31 2008 |
| Cause | No Input Signal |
| Duration | 0 Days, 0 h, 0m, 7s |

2
| Date | Fri Dec 19 15:25:31 2008 |
| Cause | Input Datastream Timeout |
| Duration | 0 Days, 0 h, 0m, 8s |

3
| Date | Fri Dec 17 10:48:58 2008 |
| Cause | Input Datastream Timeout |
| Duration | 0 Days, 0 h, 0m, 1s |

4
| Date | Fri Dec 19 15:25:31 2008 |
| Cause | Input Datastream Timeout |
| Duration | 0 Days, 0 h, 2m, 13s |

FIG-17

SYSTEM AND METHOD FOR REMOTELY IDENTIFYING DISPLAY COMPONENTS

CROSS-REFERENCE TO RELATED APPLICATIONS

This application is a non-provisional of U.S. Application No. 61/312,892 filed Mar. 11, 2010 and is hereby incorporated by reference as if fully cited herein. This application is a continuation in part of U.S. application Ser. No. 12/763,797 filed Apr. 20, 2010 and is hereby incorporated by reference as if fully cited herein. This application is a continuation in part of U.S. application Ser. No. 12/986,787 filed Jan. 7, 2011 which is a non-provisional of U.S. Application No. 61/308,139 filed Feb. 25, 2010 each of which are hereby incorporated by reference as if fully cited herein. This application is a continuation in part of U.S. application Ser. No. 12/706,594 filed Feb. 16, 2010 which is a non-provisional of U.S. Application No. 61/152,876 filed Feb. 16, 2009 each of which are hereby incorporated by reference as if fully cited herein. This application is a continuation in part of U.S. application Ser. No. 12/706,602 filed Feb. 16, 2010 which is a non-provisional of U.S. Application No. 61/152,876 filed Feb. 16, 2009 each of which are hereby incorporated by reference as if fully cited herein.

TECHNICAL FIELD

Exemplary embodiments generally relate to systems and methods for remotely identifying one or more components within one or more electronic displays.

BACKGROUND OF THE ART

Electronic displays have previously been used predominantly in indoor entertainment applications such as home theatres and bars/restaurants. However, as the performance characteristics and popularity have grown, electronic displays are now being used in many new environments for both entertainment as well as informational and advertising purposes. Displays are now used in airports, shopping malls, sides of buildings, arenas/stadiums, menu boards, and as advertising signs and/or billboards. Some displays are also used for both indoor and outdoor environments.

Over many hours of use, even the most reliable electronic displays are know to degrade in performance or possibly have one or more components fail prematurely. When a display is used for advertising purposes, a sudden failure or degradation in performance can result in the loss of critical advertising exposure and a possible loss of revenue to the advertising firm. Further, when a display is used for information, a failure of the display may result in the loss of critical information such as flight schedules or emergency alerts. Also, in some applications a display may be required to maintain a certain level of performance (ex. gamma saturation, contrast, luminance, color saturation, etc.). A user may want to monitor the various parameters of the display to determine when the display may begin to degrade in performance. In some applications, many displays may be mounted in a particular location. For example, some airports or transit stations may contains hundreds of displays. It may be desirable for a user to have the ability to monitor the performance characteristics of one or more displays from a remote location.

Establishing a means for communication between the user and one or more electronic displays may permit remote updating of software used to drive the display. As the display's hardware designs evolve, more features and software updates may also be developed. Some displays which are already in operation may accept software updates depending on the hardware revisions that are installed in the present display. There is a need to diagnose the particular hardware components installed within an electronic display so that potential software updates can be installed if there is compatibility between the hardware and software. The ability to remotely determine the hardware revisions is also desirable so that performance issues with the display may be diagnosed and potentially resolved remotely.

SUMMARY OF THE EXEMPLARY EMBODIMENTS

Exemplary embodiments provide communication between one or more displays with a user through an internet or network connection. In some embodiments this communication would be two-way communication. Electronic data may be sent from one or more displays to a user for monitoring the displays, ensuring adequate performance for the customer, gathering data for reliability research and analysis, as well as diagnosing and possibly fixing some display problems remotely.

Exemplary embodiments may display a predetermined watermark on the display and measure the characteristics of the watermark through one or more color light sensors which are embedded within the display. The color light sensor provides feedback data regarding any number of performance characteristics of the display. The data may be stored internally within the display for a certain amount of time (or until the local storage is full) and may be sent to a user remotely when requested. The data can indicate failures in some of the display components and can also provide input as to the actual performance of the display. Some end-users require specific performance characteristics of their displays and embodiments help to collect the data which can determine whether the displays are meeting the required characteristics. The data can be plotted and analyzed in a number of ways to evaluate the performance of the display.

An exemplary embodiment may place local storage devices at one or more components within the display, which can be read remotely to determine exactly what piece of hardware (or sometimes software) was installed with any particular component. Thus, if software updates are being considered, a user can check to determine if the hardware can support the software update. Further, if a particular piece of hardware has been found to be prone to failure, the displays which contain this hardware can be located and serviced without having to open and inspect every display to find which ones contain the particular piece of hardware. In some embodiments the local storage devices can also store important performance data such as maximum temperature and/or current draw. This data can provide valuable feedback when diagnosing performance issues/problems and troubleshooting failures.

The foregoing and other features and advantages will be apparent from the following more detailed description of the particular embodiments of the invention, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIGS. 2-12 show a series of screenshots for an exemplary web interface for the user to access status information about the display;

FIGS. 14-18 show a series of screenshots for an exemplary web interface for the user to access information about both the transmitters and the displays.

DETAILED DESCRIPTION

Figure 1:
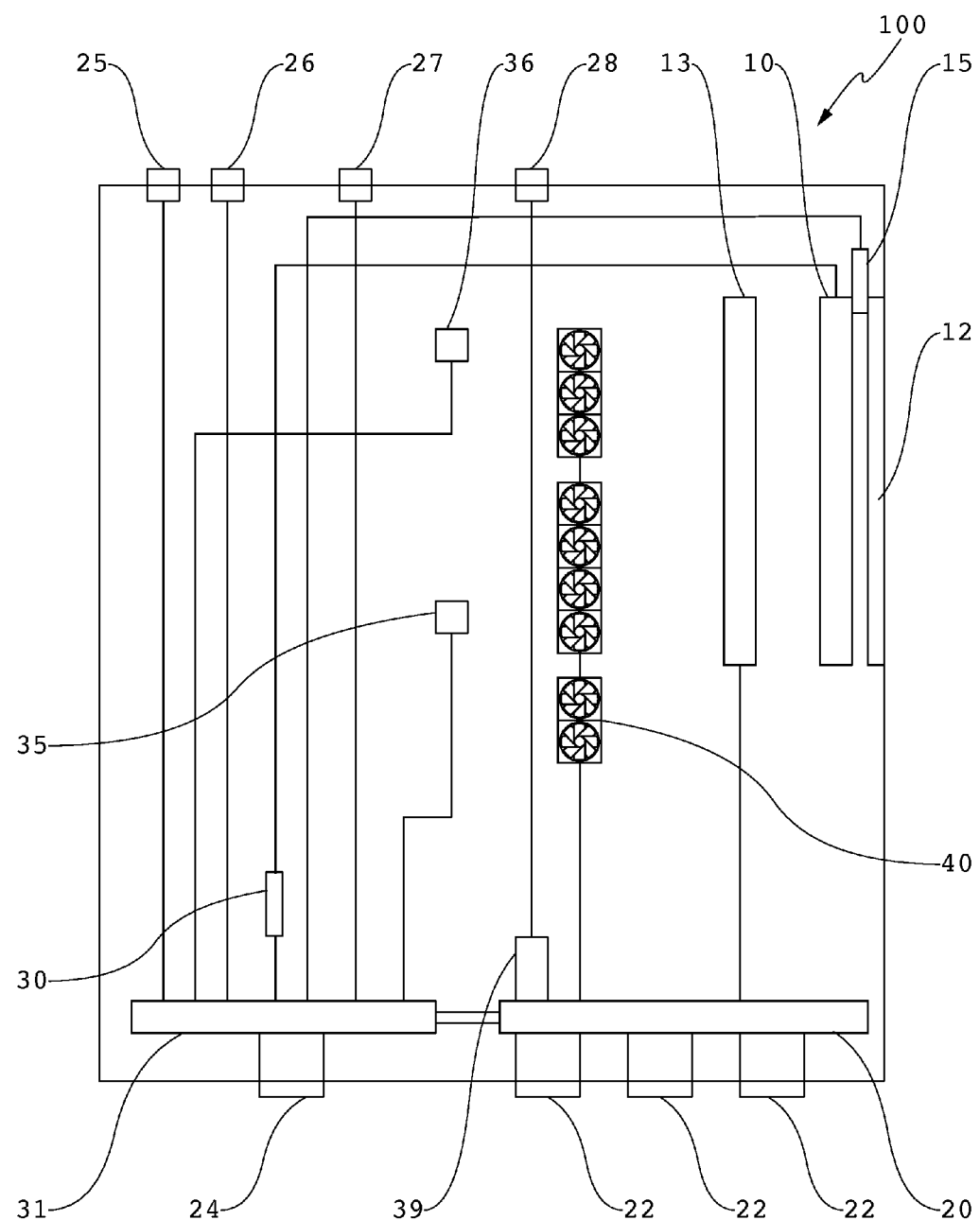
FIG. 1 is shows an electrical block diagram for an exemplary display which contains an embodiment of the display communication system.

FIG. 1 shows an electrical block diagram for an exemplary display 100 which contains an embodiment of the display communication system. A color light sensor 15 may be placed in front of the display assembly 10. In this embodiment, the color light sensor 15 is placed between the display assembly 10 and the front display plate 12 which may protect the display from damage or provide additional optical properties (anti-reflection, polarizing, optical matching, light absorption, etc.). The specific embodiment shown here could be used with an LCD display, where the display assembly 10 may be an LCD stack with an associated backlight assembly 13 placed behind the LCD stack. Obviously, with other embodiments using other types of display assemblies, a backlight assembly 13 may not be necessary. For example, an organic light-emitting diode (OLED), light emitting polymer (LEP), or electroluminescent display may be used as the display assembly 10 where a backlight would not be required.

The display assembly 10 may be in electrical communication with a timing and control assembly (TCON) 30. The color light sensor 15 and TCON 30 may be in electrical communication with a signal backplane 31. If a backlight assembly 13 is used, it may be connected to a power backplane 20 which may also be connected to one or more power module assemblies 22. A temperature sensing device may be placed on or near each power module assembly 22 in order to measure the temperature of the power module assembly 22. A display controller assembly 24 may also be in electrical communication with the signal backplane 31. The power backplane 20 may be in electrical communication with the signal backplane 31. The display controller assembly 24 may include several different components including, but not limited to a video receiving unit, decompressor, and display interface board (DIB). In some embodiments, the TCON 30 may be incorporated into the display controller assembly 24.

Other elements may also be in electrical communication with the signal backplane 31, including but not limited to an ambient light sensor 35 and a backlight sensor 36. An ambient light sensor 35 may be used to detect the amount of ambient light which is present. A backlight sensor 36 may be used to detect the level of luminance that is being produced by the backlight assembly 13 (if used). Exemplary embodiments may also utilize a plurality of temperature sensing devices, placed in electrical communication with a backplane and placed to sense the temperature of the backlight 13, display assembly 10, power module assemblies 22, inlet/exit air temperatures, and the exterior environment temperatures.

The display may contain several input/output interfaces. A video input 25 accepts the video data from a video source and may connect to the signal backplane 31 or may connect directly to the display controller assembly 24. An RS232 interface 26 as well as an Ethernet/network interface 27 may be used to provide communication between the various display components and the user. The RS232 interface 26 may use standard levels and signals to allow connection to a personal computer. The Ethernet/network interface 27 may provide automatic sensing to allow connection directly to a PC or network hub. Through one or both of these interfaces 26 and 27, the user can communicate with the display to accomplish a variety of different objectives. It should be noted that this is only one embodiment for the input/output interfaces for a display. Other embodiments may not use the RS232 interface 26 and instead would only use the Ethernet/network interface 27. In wireless applications, a wireless network card (or other type of wireless transmitting/receiving device) may be used to both receive the video data and communicate with the user over a network connection. In these embodiments, the wireless network card may replace the RS232 interface 26, Ethernet/network interface 27, and the video input 25. The wireless application will be discussed further below.

A power input 28 may be connected to the power backplane 20. A current monitoring device 39 may be placed between the power input 28 and the power backplane 20 in order to measure the power consumption of the display. One or more fans 40 may be used to cool the display and may be electrically connected to the power backplane 20. Although shown in the figure with a signal backplane 31 and a power backplane 20 as separate elements, this may not be used in all embodiments. In some embodiments, the power and signal backplanes may be incorporated into a single backplane.

The color light sensor 15 may be placed in front of the display assembly 10 so that it may detect various properties of a pre-determined watermark that may be displayed on the display assembly 10. The watermark may be generated by one or more components of the display controller assembly 24, TCON 30, or any other local storage/control assembly. The watermark may be automatically created by the display or may be shown when directed by the user. The watermark may be a grouping of image elements (ex. pixels) on the display which are selected to display a specific color or set pattern of colors for measurement by the color light sensor. The watermark can be placed anywhere on the display, but since the color light sensor should preferably be placed in front of the display, the watermark should preferably be placed in a corner or near the edge of the display so that the image is only disrupted a minimal amount. In some embodiments, the watermark may simply be a small shape showing a solid color (ex. Red (R), Green (G), Blue (B), or White (W)). The watermark may show each color for a predetermined amount of time while its properties are measured by the color light sensor 15. For example, the watermark may cycle through squares/rectangles of the following colors in the following times: T1=R, T2=G, T3=B, T4=W, T5=R, etc.

In one embodiment, when the display is initially installed it may be inspected to determine that it is operating properly. Then, once the watermark begins to be displayed, the measurements of the color light sensor may be stored as the reference points for comparison throughout the life of the display. Once the color light sensor determines that the measurements have fallen outside of an acceptable range, this may be indicated to the user (either automatically or when the user requests the data) and the display may need certain parameters reset or may possibly need serviced and/or replaced. In other embodiments, the required measurement values from the color light sensor may be pre-determined and stored within the display controller assembly 24. Then during the life of the display, the measurements from the color light sensor 15 are compared with these pre-determined values and when they fall outside the acceptable range, an error may be reported to the user.

Some embodiments may not report errors out to the user immediately, but instead may simply store the data internally for later retrieval by the user. Once the data is retrieved and analyzed it can be determined that the display has malfunctioned and may continue to malfunction.

Exemplary embodiments may provide constant feedback on the performance of the display 100 and can quickly notify the user that the display 100 is not functioning properly. Notifications may be sent to the user's PC through the RS232 interface 26 or to any remote location using the Ethernet/network interface 27. A variety of internet notifications could be sent to the user through the Ethernet/network interface 27. Notifications could include email, instant messaging, text messaging, or a web page which can be accessed by the user and may contain the data for a number of different displays (discussed further below). Prior to the exemplary embodiments herein, a user would have no notice of a malfunctioning display unless actually observed by the user. As discussed above, a user may have many displays in operation and it may be difficult or impossible to closely monitor them. The display may have been malfunctioning for some time before the user actually notices the failure. In some situations, even actual observation may be difficult since some display parameters are sometimes difficult or impossible to notice by simply looking at the display with the naked eye.

The display may generate and display the same watermark regardless of the video which is being displayed. Alternatively, each video stream may include its own specific watermark. This method would be advantageous as it would permit a measurement of the precise amount of time that each video is being displayed. This would allow an advertising firm to determine exactly how long each client's advertisements were shown on which specific displays. This can be advantageous when many different displays are being used to advertise for many different clients. This would also permit very precise and accurate billing to the clients of the advertising firm.

The embodiments herein allow for a near instantaneous detection of failures in communication between display components, including but not limited to the TCON, DIB, display assembly, and all of the cabling/connections in between. In addition to the monitoring of the display components for proper operation, a number of different display parameters can be monitored by the embodiments described herein, including but not limited to: gamma saturation, contrast, luminance, and color saturation.

As an advanced embodiment of the setup described herein, each bit level for each color may be measured to determine if it is working properly. For example, with a typical LCD display, the luminance level for each subpixel (red, green, and blue) may be defined by 8 bits. Thus, each subpixel can vary from Gamma 0 (black) to Gamma 255 (full on). To test the red subpixels for this example, the bits can vary from: 00000000 (black), 00000001, 00000010, 00000100, 00001000, 00010000, 00100000, 01000000, 10000000, 11111111 (full on). By driving the red subpixels at each bit variation and measuring the output by the sensor, it can be determined if each bit level is functioning properly. Obviously, this can be repeated for the green and blue subpixels.

Many types of color light sensors would work with the embodiments described herein. An exemplary color light sensor is the TCS3404CS or TCS3414CS which are commercially available from Texas Advanced Optoelectronic Solutions® (TAOS) of Plano, Tex. www.taosinc.com. The TAOS specification document TAOS068 entitled TCS3404CS, TCS3414CS Digital Color Light Sensors' is herein incorporated by reference in its entirety.

Various display types can be used with the embodiments described herein, including but not limited to LCD, plasma, LED, organic LED, light-emitting polymer, field emission display, and organic electro luminescence. As discussed above, some of these displays may not require a backlight assembly. Embodiments may be used with displays of other types including those not yet discovered.

Various hardware components in the exemplary display described above may contain an electronic board, typically containing several electronic components and may be used to drive the specific piece of hardware and help it communicate with the rest of the display components and ultimately the user. For example, any one of the following components may contain an electronic board, such as a printed circuit board (PCB): TCON 30, signal backplane 31, power backplane 20, power module assembly 22, display controller assembly 24, current monitoring device 39, and others. Any of these electronic boards may contain a local electronic storage device which can be pre-programmed at the time of installation (or afterwards) to identify the specific pieces of hardware that are being used in the display. The electronic storage device can be used to store a plurality of different information, including but not limited to: the precise version of software loaded onto the device, the model/batch number for one of the components, the manufacturer of a component, and/or a date/time stamp of manufacturing. In other embodiments, an electronic storage device may simply be placed in electrical communication with a backplane (signal, power, or otherwise). Through electrical communication, a user can access an electronic storage device through the network/internet interface and retrieve any of the stored information. An exemplary electronic storage device may be an EPROM, EEPROM, hard drive, or flash storage device.

In some applications, user's may install numerous displays at a certain location (i.e. airports, metro stations, malls, etc) and the delivery and installation may take place over a period of time when the displays are being updated with increased functionality and features. While some installed displays may support software updates, other which lack the required hardware cannot accept the new software. With the embodiments herein, a user can access a local electronic storage device and determine the precise hardware/software version that is installed within the particular display. Decisions can be made remotely as to which displays should be serviced and/or updated.

Further, if a particular piece of hardware has been problematic, a user can quickly search the local electronic storage devices of any number of displays to determine which displays contain the problematic piece of hardware. This data can be used for decision-making (Should the component be replaced? How many displays have this component? Where are these display located?) and implementing a retro-fit or replacement service plan (Which displays have been replaced? How many displays remain with the problematic piece of hardware?).

Still further, the electronic storage device may retain important pieces of performance data for later retrieval by the user. By example and not by way of limitation, the min/maximum temperature reading, min/maximum current draw, min/maximum light measurement from a piece of hardware can be stored in the local storage device. This data is helpful at least for reliability testing/analysis and troubleshooting failure modes. FIGS. 11 and 12 below illustrate how a user may access the various types of information from the local storage devices. Updating software is discussed below in reference to FIG. 18. Once it has been determined that the particular hardware installed with the display can support the software update, it may be installed remotely through the display's network connection. The network connections herein preferably connect with the internet but can also be used only on a local area network (LAN) as well.

Figure 2:
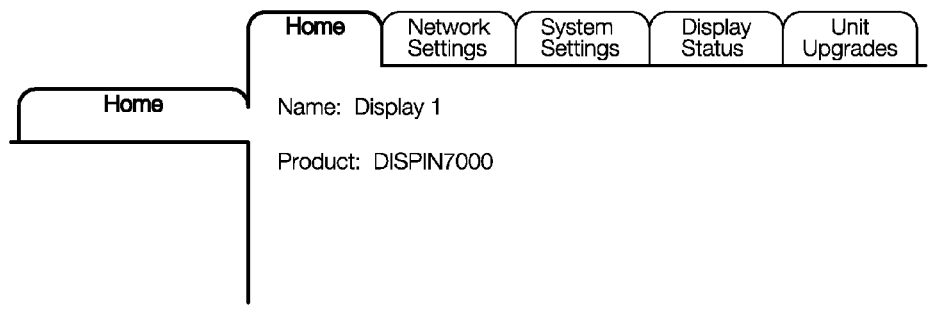
Figure 3:
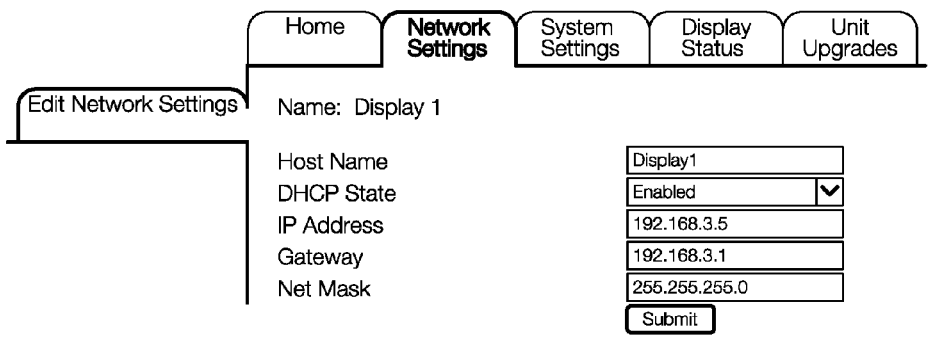

FIG. 2 provides a screenshot of a web-based user interface for monitoring the performance of a display. This screen shot shows the 'Home' tab which provides the name of the display and the specific product. FIG. 3 provides a screen shot of an exemplary Network Settings tab. With this menu, the user can view and/or modify the Host Name, DHCP State, IP Address, Gateway, and Net Mask settings. The Host Name can simply allow the user to utilize a meaningful name for the display, or perhaps indicate its location. The DHCP State may be 'disabled' when the IP address is to be a fixed address. The DHCP State may be 'enabled' when it is desirable to assign the IP address automatically by the network router. The IP Address may be used for the purposes of remote status and monitoring and should preferably be a known IP address on the company intranet, but this is not required. The Gateway may represent the IP address of the upstream connection that the system may use for all outgoing network communications. The Gateway value should preferably be assigned during installation. The Net Mask setting may represent the network mask value for the upstream connection that the system may use for all outgoing network communications. After the user enters any Network Settings, pressing the 'Submit' button will allow the system to accept the values. The display may reboot.

Figures 6, 7:
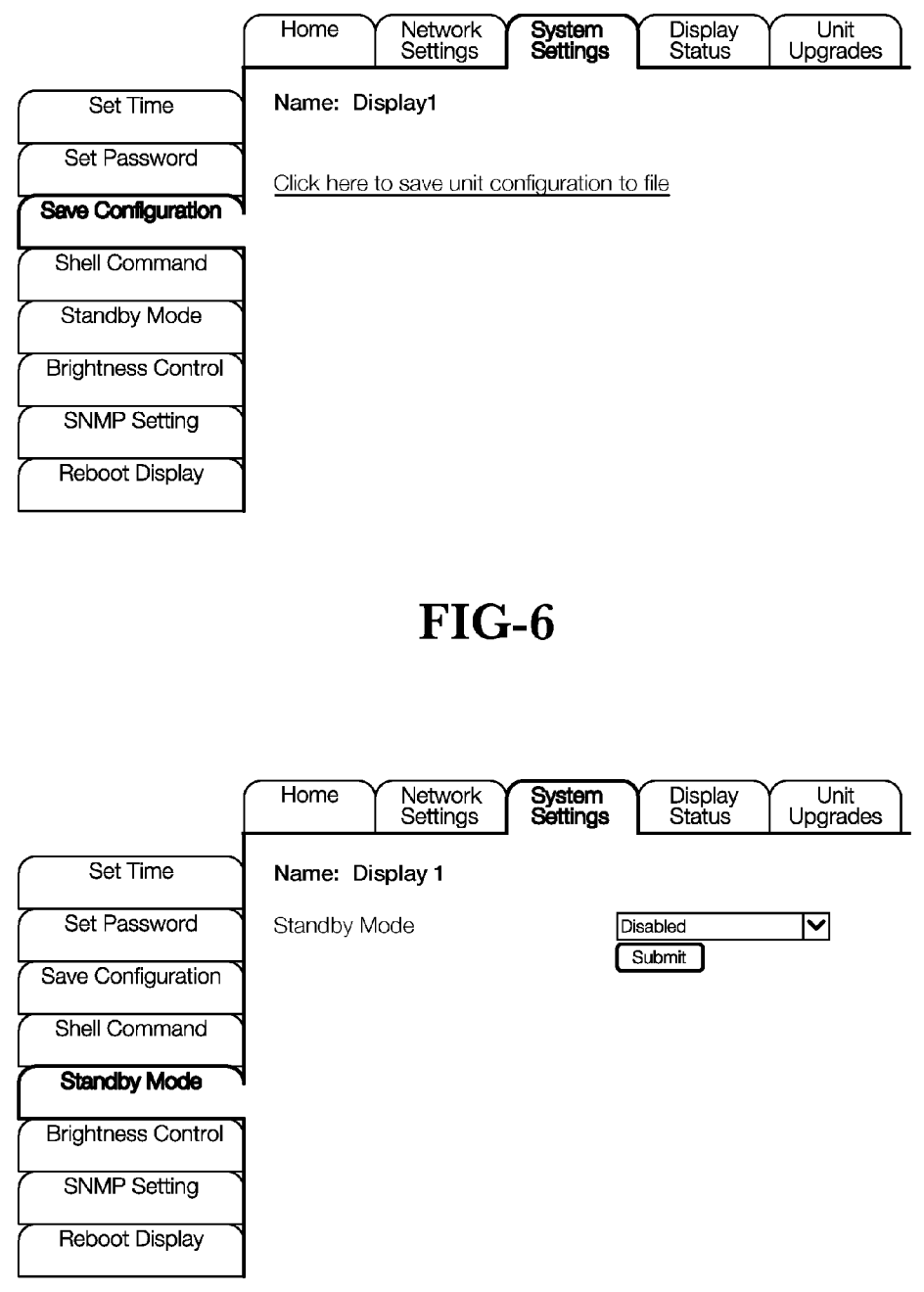

FIG. 4 provides a screenshot for the Set Time section of the System Settings tab. Under this section, the time/date settings for the display may be controlled. For security reasons, FIG. 5 provides the Set Password section of the System Settings tab where a password can be used to control access to the display. FIG. 6 indicates the Save Configuration section where the displays configuration may save all system parameters to a configuration file. The Shell Command section may be setup for maintenance purposes. FIG. 7 shows the Standby Mode section where the user can enable or disable the ability to operate the display for a period of time with the backlight off.

FIG. 8 provides the various parameters of the Brightness Control section of the System Settings tab where the user may set the brightness of the display to by dynamically controlled based on ambient light conditions or set to a fixed value. Enabling the Dynamic Brightness Control allows the brightness to be automatically adjusted based on ambient light conditions. Disabling the Dynamic Brightness Control allows the user to set and maintain the brightness level at a constant value (as supplied by the Fixed Brightness Value). The Ambient Sensor Location allows the user to select the location of the ambient light sensor. The High Ambient Reading allows the user to select a value for the ambient light sensor where once this value is read by the ambient light sensor, the backlight is driven at the Desired High Nits Value. The Fixed Brightness Value is the chosen constant brightness value when the Dynamic Brightness Control is Disabled. The Desired High Nits is the desired brightness level in nits during high ambient light conditions. This value may only affect the brightness level when the Dynamic Brightness Control is set to Enabled. Desired Low Nits is the desired brightness level in nits during low ambient light conditions which is also takes effect only when the Dynamic Brightness Control is set to Enabled.

Figure 10:
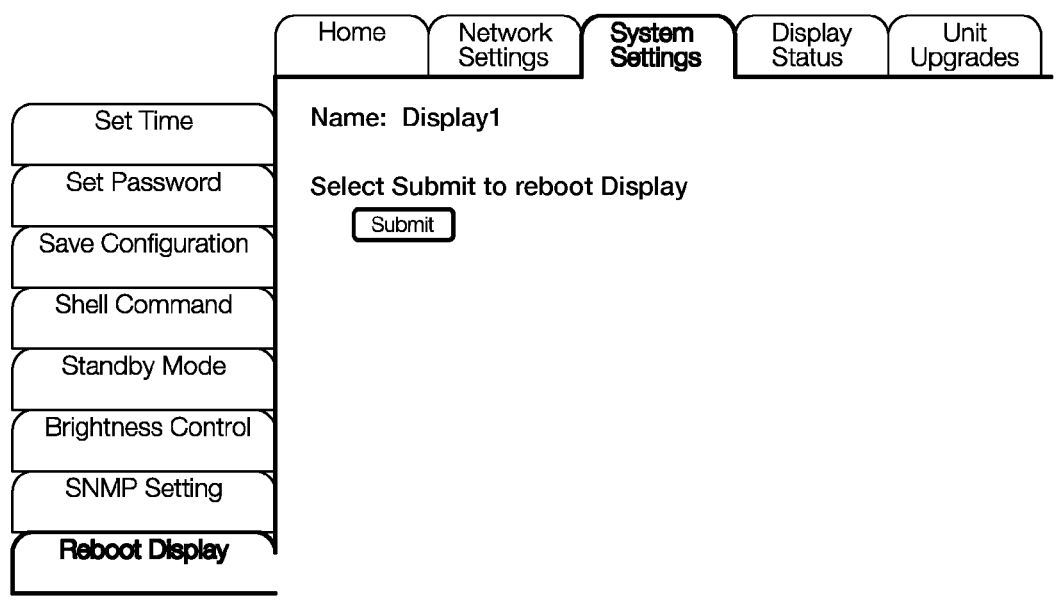

FIG. 9 provides the SNMP Settings section where a user may utilize an SNMP Manager if the SNMP Community String is configured. FIG. 10 provides the Reboot Display section of the System Settings tab where the user can reboot the display.

FIG. 11 shows an embodiment for a display page where the Display Status tab has been selected along with the Basic Status section. As shown in this figure, a large amount of information can be shown to the user on this page. This data could be recorded, sorted, and/or plotted in any way that is convenient to the user. Any type of 'data dump' into a familiar format (ex. Excel or Numbers) for the user could also be accomplished.

As shown in the Figure, the temperature, current draw, and status of each power module (power supply) can be accepted and displayed. Operating parameters can be pre-chosen for the power modules so that if the temperature or current strays outside of an acceptable range, then the Status indication changes from OK to BAD.

Also shown in the figure, various types of identifying information for the display can be stored on an electronic storage device and accessed later by the user. For example, the display serial number, board revision, redboot version, kernel version, root filesystem version, total elapsed time, backlight on time, and total valid video input time can be stored. Still further, the serial or model numbers (identification numbers) can be stored for other components as well, including but not limited to: display controller assembly, video player, decompressor, power supplies, video receiving unit, TCON, fans, display interface board (DIB), temperature sensing devices, color light sensor, ambient light sensor, backlight sensor, and backlight.

FIG. 12 shows an embodiment for a display page where the Display Status tab has been selected along with the Downtime Incidents section. For each downtime incident, the date, cause, and duration of the incident may be recorded and displayed to the user. The downtime incidents may be reset manually, after a pre-determined amount of time has lapsed, or after a pre-determined number of downtown incidents have been observed. Specifically, the data for the power supply(s) (power module assemblies) can be viewed, including the status, current draw, and temperature. Further, additional temperature sensing devices can be placed throughout the display to provide temperature data, as shown in FIG. 11. Each temperature sensing device is preferably placed in electrical communication with a backplane.

Figure 13:
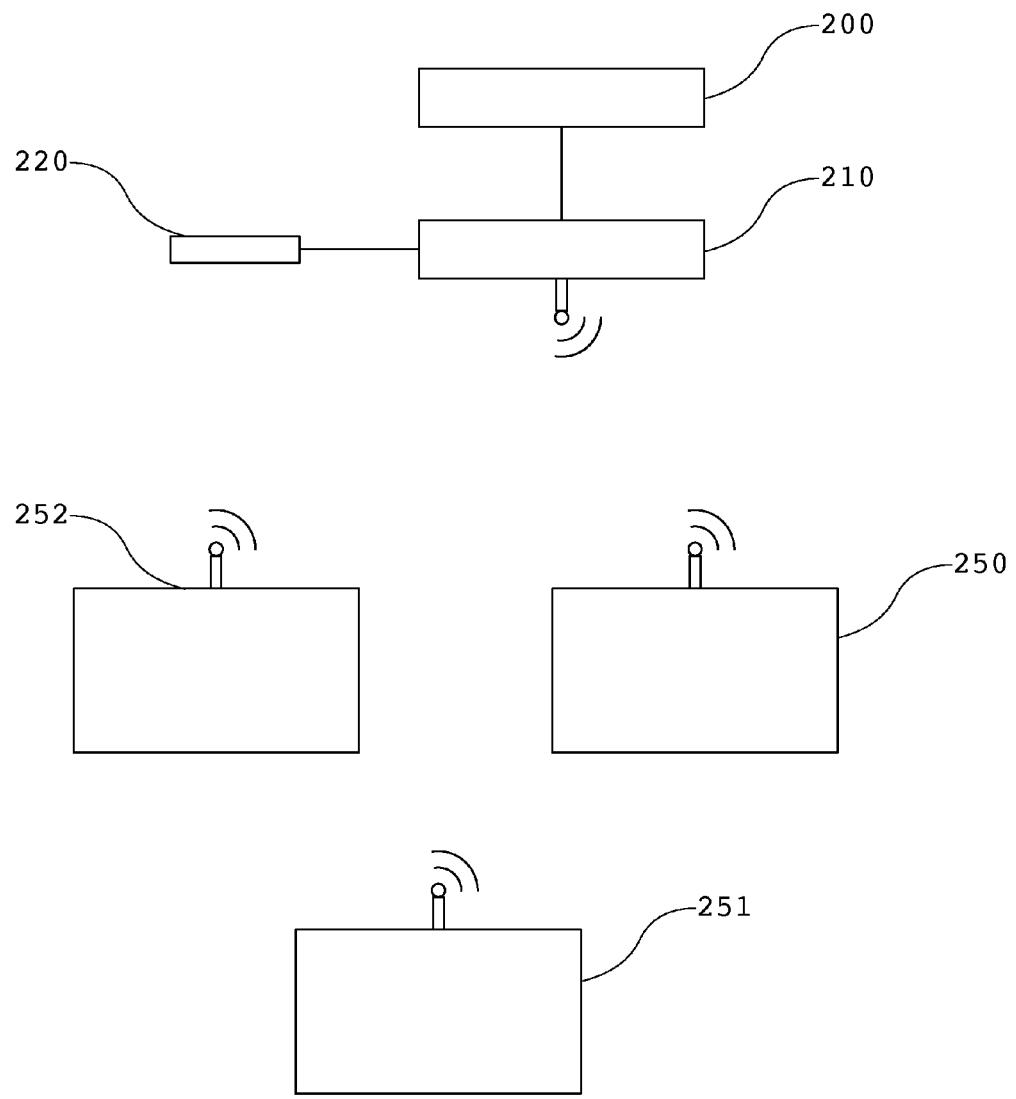
FIG. 13 is an electrical schematic showing an embodiment of the display communication system when using a wireless transmitter and several displays.

FIG. 13 shows an embodiment of the display performance monitoring system when using a wireless connection with several displays. In this embodiment, a video player 200 provides the video (and optional audio) data to the transmitter 210. The transmitter 210 may be in two-way wireless communication with several displays 250, 251, and 252. The transmitter 210 may also be in communication with an internet connection and/or network hub 220 so that a user may access information from the displays/transmitter from any network connection. Further, the transmitter 210 may be in two-way communication with the video player 200, so that video data can be sent from the internet connection and/or network hub 220 to the video player 200 through the transmitter 210. However, in other embodiments a video player 200 may be connected directly to the internet connection and/or network hub 220.

In further embodiments, a video player 200 may not be used. Instead, video data would be transmitted from a remote source to the internet connection and/or network hub 200 and directly to the transmitter 210. In these embodiments, there may be a local storage device at the display which could act as a video player.

With embodiments such as the one shown in FIG. 13, separate user interfaces (web pages) may be created for the transmitter as well as each display (i.e. receiver). FIG. 14 provides a screenshot for a display page. Now that a wireless setup is being used, various data regarding the wireless system can be observed as it relates to the display. As shown in the figure, SSID, WPA2 Pass Phrase, Wireless Channel, Wireless Transmit Rate, Acceptable Frame Rate, and Signal Quality can all be viewed from the Network Settings tab of the display page. A link may be provided to return to the transmitter pages. In some embodiments, to communicate with the display, a user could establish a physical connection with the Ethernet/network port of the display, either directly or through a crossover cable or via a network switch.

Figure 15:
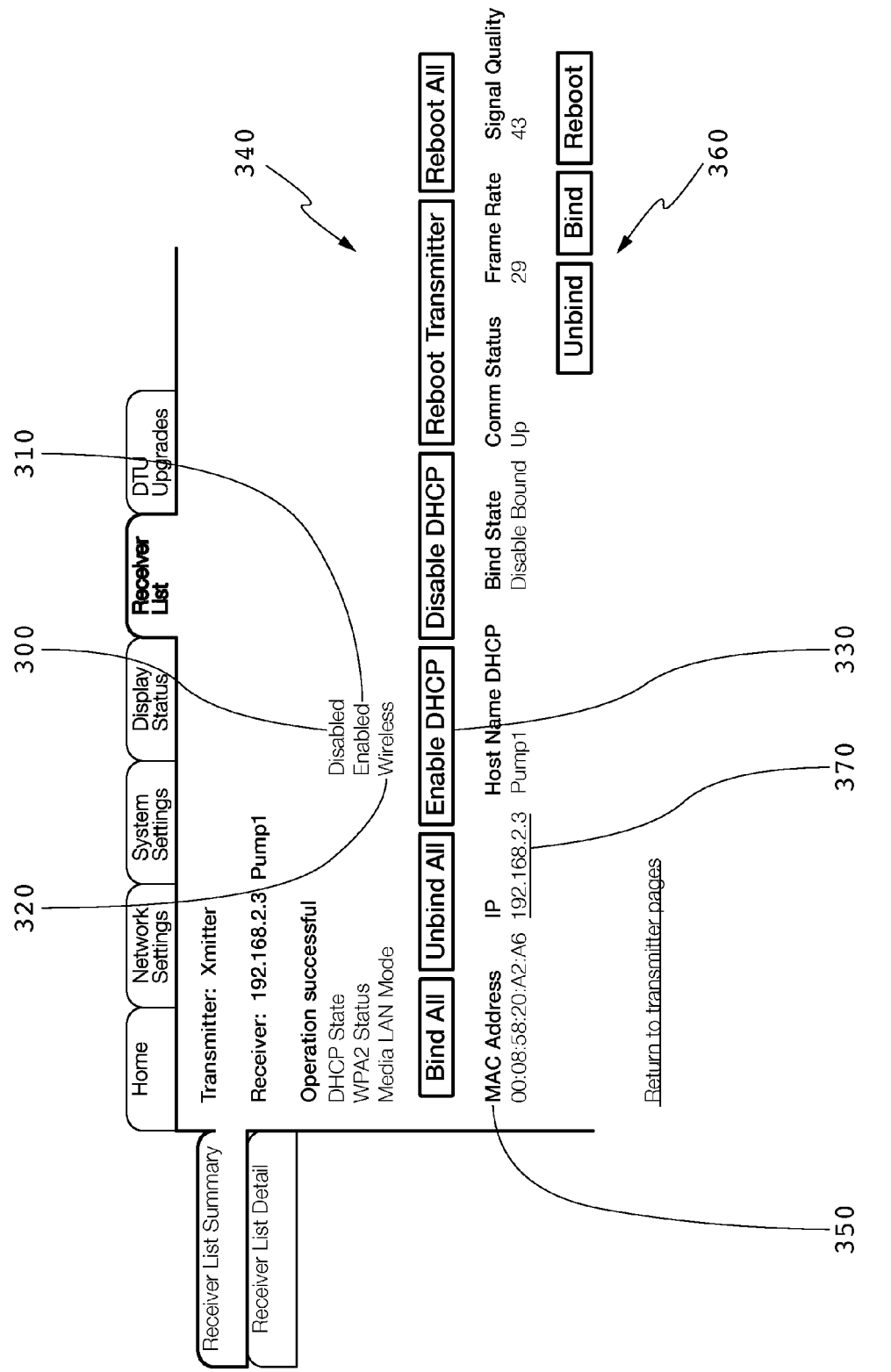

FIG. 15 shows an embodiment for a transmitter page where the Receiver List tab has been selected. This tab may provide the data for each receiver 350 that is connected to the transmitter, in a row format. This can provide a quick view for the user to determine the status of the entire site/location. The rows may be colored coded so that a user can quickly determine if a display/receiver is not performing well. The DHCP Status 300 and WPA2 Status 310 are both shown. During installation, it may be preferable to enable DHCP and disable WPA2. When the displays and transmitters are initially powered up, the displays may use DHCP to connect to a valid transmitter and may begin displaying any transmitted video data. Once this has been done, the transmitter should be connected via a switch on the same network or a crossover connection. The transmitter may be given a default IP address and by connecting a computer which is on the same subnet but with a different IP address the computer may begin communications with the transmitter. It may then be preferable to Bind 360 some or all of the displays in communication with the transmitter (the binding process is discussed further below). It may then be preferable to Disable DHCP 330 and Reboot 340 the system. At this point it may be preferable to enable WPA2 security, which can be accomplished by entering a Pass Phrase under the Network Settings tab (discussed further below). Each row showing the connected receivers may contain a hyperlink 370 which will connect to the page for the particular receiver.

In various embodiments, the transmitters and receivers may be designed to work together by default, without binding. However, in an exemplary embodiment the transmitters and receivers would utilize binding for optimal system performance. In some cases, such as multiple transmitter installations, binding may be required. The principle behind binding is to tell a transmitter that a given set of receivers should always be communicating and receiving video and sometimes audio. If one of the receivers stops responding, the transmitter may flag this receiver and report this to a user using a remote monitoring system or web-based user interface. If there is no binding, the transmitter does not expect the receiver to be there and may not recognize that a receiver has a failure. When all receivers are bound to a transmitter, a preferred embodiment may disable DHCP.

When multiple (N) transmitters are used in the same location, it may be preferred to change the wireless SSID and the wireless channel for at least N−1 of the transmitters. The basic setup as discussed above may be followed for each transmitter. Then, a user may access the Network Settings tab (shown below) for each transmitter in order to change the wireless SSID and wireless channel.

Figure 16:
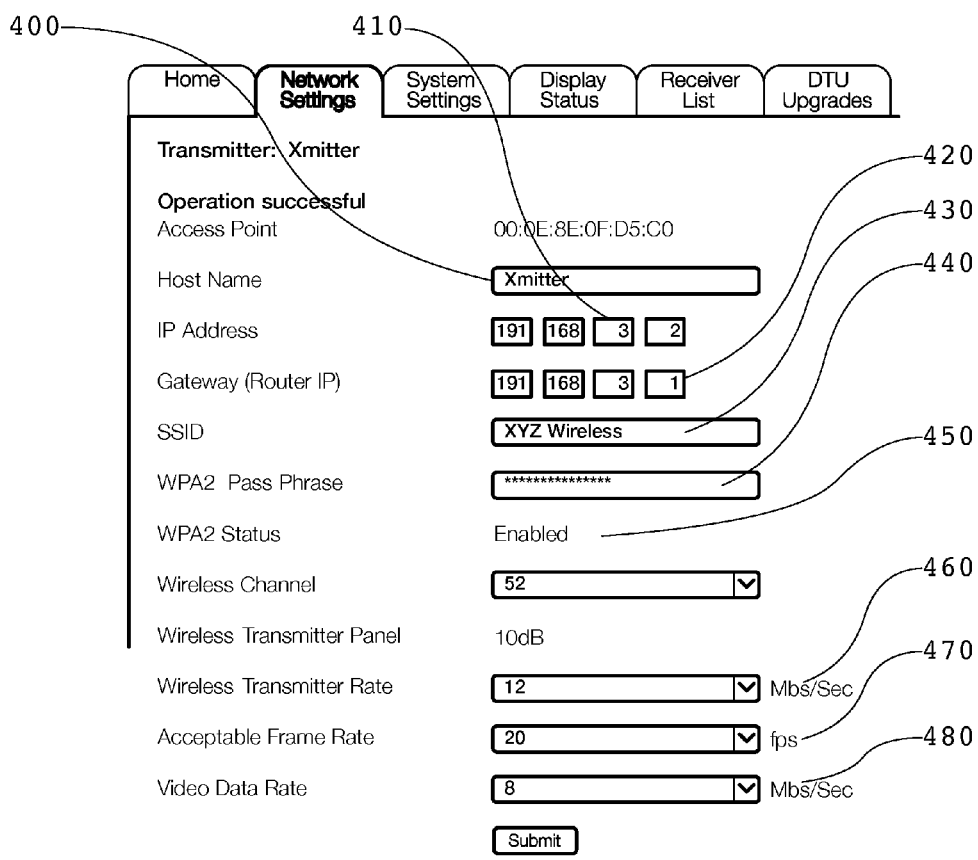

FIG. 16 shows an embodiment for a transmitter page where the Network Settings tab has been selected. Here, the Host Name 400 can be changed. The IP Address 410 may be entered to allow remote status and monitoring. It is preferable that the IP Address 410 is a statically allocated IP address on the company intranet. The Gateway IP address 420 may be entered, which may be the address of the upstream connection that the system will use for outgoing network communications. As discussed above regarding 'binding', and especially when using a multiple transmitter system, the SSID 430 may be changed. If using a single transmitter system, the SSID 430 may not require any action by the user. The WPA2 Passphrase 440 may be entered to allow WPA2 security to be enabled. When using multiple transmitter systems, the Transmission Channel 450 may be altered so that a different wireless channel could be used for each transmitter. This may reduce the interference between wireless systems. Even in some single transmitter setups, it may still be advantageous to experiment with different wireless transmission channels to find one that works the best for the particular setup and location.

In some applications, it may be desirable to alter the Wireless Transmission Rate 460. Sometimes, it may improve the video/audio throughput if the Wireless Transmission Rate 460 is lowered. As a general rule, it may be preferable to always keep the Wireless Transmission Rate 460 set at least 2 Mbps greater than the Video Data Rate 480. A Minimum Acceptable Frame Rate 470 may be selected where if the frame rate of the video stream drops below this value, a default image or logo may be displayed instead. The Video Data Rate 480 can also be adjusted which essentially controls the level of compression for the transmitted video source. As noted above, it may be preferable to keep this value less than the Wireless Transmission Rate 460 discussed above.

FIG. 17 shows an embodiment for a transmitter page where the Display Status tab has been selected along with the Downtime Incidents section. Similar to this tab and section for a display, similar data can be shown for the transmitter as well. Thus, for each downtime incident, the date, cause, and duration of the incident may be displayed. Also, the downtime incidents may be reset.

Figure 18:
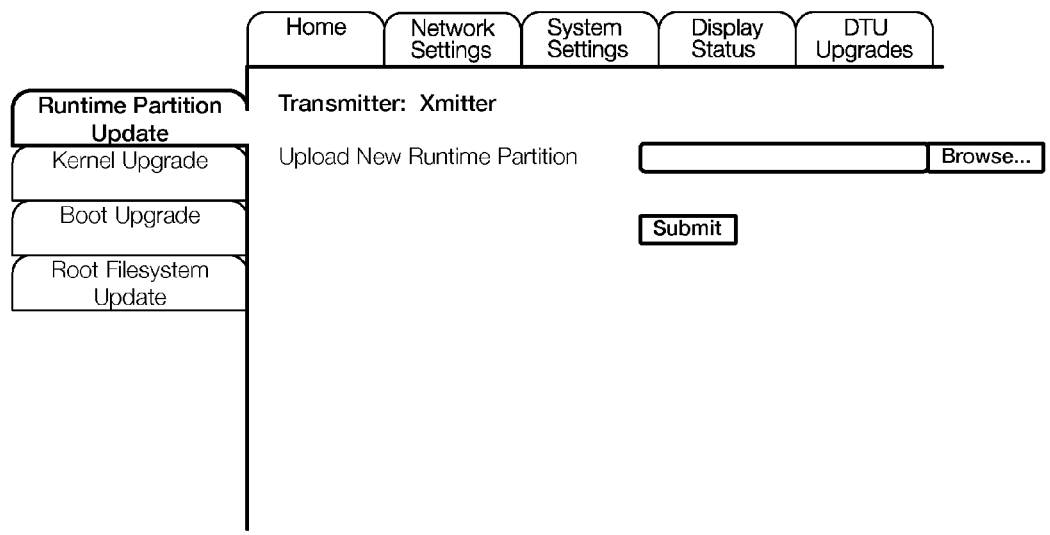

FIG. 18 shows an embodiment for a transmitter page where the DTU Upgrades tab has been selected. On this page, a user can update various types of software for the transmitter and displays. Because each type of software may require a different installation process, different sections may be created for each type of software to be updated. In this embodiment, four sections under the DTU Upgrades tab are shown: Runtime Partition Update, Kernel Update, Boot Update, and Root Filesystem Update. A user can simply select the type of software update, click 'Browse' to find the appropriate update, and 'Submit'.

The various embodiments for the user interface shown in the figures above can be run on any type of computing device. As is known in the art, any computing device with a processor can operate software to accomplish the tasks of the user interface shown and described above. Typical devices contain an electronic storage medium in electrical communication with a processor, a display, and a network communication port. Thus, the user interface shown and described herein can be operated on any computing device including but not limited to: personal computers, tablet computers, smart phones, and any other device with a processor for running software. The user interface may be web-based for running on any computing device with an internet connection or may be designed for local use (LAN).

It should be noted that the times/dates for the information shown on the various user interfaces was arbitrary and simply selected to show the various embodiments of the system. The times/dates which are shown in no way indicate that activity regarding the various embodiments actually occurred on those dates.

As used herein, the term 'identification number' is meant to represent any string of characters that can be used to identify a particular component/software version. Thus, an 'identification number' can contain letters, symbols, numbers, spaces, characters, and any combination thereof.

Having shown and described preferred embodiments, those skilled in the art will realize that many variations and modifications may be made to affect the described embodiments and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A system for remotely-identifying the components of a plurality of displays, the system comprising:
    a plurality of electronic displays, each display having
        a display assembly having an associated display assembly identification number,
        a backplane in electrical communication with the display assembly,
        a power module in electrical communication with the backplane and having an associated power module identification number,
        a printed circuit board (PCB) in electrical communication with the backplane and having an associated PCB identification number,
        an electronic storage device in electrical communication with the backplane which stores the identification numbers of the display assembly, power module, and PCB, and
        a network communication port in electrical communication with the backplane,
    a computing device with a display placed in electrical communication with the network communication port of each electronic display which displays the display assembly, power module, and PCB identification numbers for each display.

2. The system of claim 1 wherein:
the computing device searches the plurality of electronic displays for a selected identification number.

3. The system of claim 1 wherein:
the identification number identifies the particular version of the display assembly, power module, and PCB and
the computing device is adapted to search each display for a particular version of any one of the following: display assembly, power module, and PCB.

4. A method for locating a selected component within a plurality of electronic displays, each electronic display having a display assembly with an associated display assembly identification number, a power module having an associated power module identification number, a printed circuit board (PCB) with an associated PCB identification number, and an electronic storage device, the method comprising the steps of:
    storing the display assembly, power module, and PCB identification numbers on the electronic storage device of their respective electronic display;
    placing each electronic storage device in electrical communication with a network;
    selecting a display assembly, power module, or PCB with an associated component identification number, resulting in a selected component identification number;
    searching each of the electronic storage devices for the selected component identification number; and
    displaying the electronic displays which contain the selected component.

5. The method of claim 4 wherein:
the electronic storage device is an EEPROM.

6. The method of claim 4 wherein:
the electronic storage device is a flash storage device.

7. The method of claim 4 wherein:
the network connection is an internet connection.

8. A method for locating a selected component within a plurality of electronic displays, each electronic display having a display assembly with an associated display assembly identification number, a power module having an associated power module identification number, a printed circuit board (PCB) with an associated PCB identification number, and an electronic storage device, the method comprising the steps of:
    storing the display assembly, power module, and PCB identification numbers on the electronic storage device of their respective electronic display;
    placing each electronic storage device in electrical communication with a network;
    selecting a display assembly, power module, or PCB with an associated component identification number, resulting in a selected component identification number;
    requesting the component identification numbers from each electronic storage device over said network;
    receiving the component identification numbers from each electronic storage device over said network;
    filtering the received component identification numbers for the selected component identification number; and
    displaying the electronic displays which contain the selected display assembly, power module, or PCB.

9. The method of claim 8 wherein:
the electronic storage device is a flash storage device.

10. The method of claim 8 wherein:
the network connection is an internet connection.

* * * * *